United States Patent
Kimura et al.

(10) Patent No.: US 9,033,086 B2
(45) Date of Patent: May 19, 2015

(54) CONSTRUCTION MACHINERY

(75) Inventors: Shougo Kimura, Tsuchiura (JP);
Tomoyuki Tanaka, Tsuchiura (JP);
Hiroshi Tabeta, Tsuchiura (JP); Hajime Ishii, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 271 days.

(21) Appl. No.: 13/698,931

(22) PCT Filed: May 24, 2011

(86) PCT No.: PCT/JP2011/061885
§ 371 (c)(1),
(2), (4) Date: Nov. 19, 2012

(87) PCT Pub. No.: WO2011/148945
PCT Pub. Date: Dec. 1, 2011

(65) Prior Publication Data
US 2013/0058747 A1    Mar. 7, 2013

(30) Foreign Application Priority Data
May 24, 2010    (JP) .................................. 2010-118565

(51) Int. Cl.
*B62D 33/06*    (2006.01)
*B60R 3/00*    (2006.01)
*E02F 3/32*    (2006.01)
*E02F 9/16*    (2006.01)

(52) U.S. Cl.
CPC .............. *B62D 33/0617* (2013.01); *B60R 3/00* (2013.01); *E02F 3/325* (2013.01); *E02F 9/163* (2013.01)

(58) Field of Classification Search
USPC ........................................... 180/89.12, 89.13
IPC .................................................... B62D 33/0617
See application file for complete search history.

(56) References Cited

U.S. PATENT DOCUMENTS 3,802,530 A * 4/1974 Purcell et al. ............... 180/89.12
2014/0124280 A1* 5/2014 Kimura et al. ............. 180/89.12

FOREIGN PATENT DOCUMENTS

JP    1-175490 U    12/1989
JP    2002-294754 A    10/2002
(Continued)

OTHER PUBLICATIONS

International Search Report dated Aug. 23, 2011 including English-language translation (Four (4) pages).

*Primary Examiner* — Faye M Fleming
(74) *Attorney, Agent, or Firm* — Crowell & Moring LLP

(57) ABSTRACT

[Problem] To provide a construction machine with a step arranged in an operator's cab, which makes it possible to enlarge the shape or dimensions of the step without increasing a swing radius.
[Solution] In a compact excavator provided with a step that facilitates ingress to and egress from the operator's cab (6), the step is provided at a part thereof with an outwardly-extending edge portion (12a) that extends out beyond an opening plane (16) forming an ingress/egress opening (20), and a door (5) is provided at a part thereof with a convex part (5a) that covers the outwardly-extending edge portion (12a) of the step when the door (5) is in a closed position. A floor (11) of the operator's cab (6) includes a flat part (11a) arranged on a front side of a seat (4) and a stepped part (11b) arranged in conjunction with the flat part (11a) and on a side of the ingress/egress opening, a flange part (12) which lies in a same plane as the stepped part (11b) of the floor (11) is arranged in conjunction with the stepped part (11b) and in the operator's cab (6), the step includes the stepped part (11b) of the floor (11) and the flange part (12), and the flange part (12) is provided with the outwardly-extending edge portion (12a).

4 Claims, 4 Drawing Sheets

(56) References Cited

FOREIGN PATENT DOCUMENTS

| JP | 67533 A | 3/2005 |
| JP | 2005-226307 A | 8/2005 |
| JP | 2007-162313 A | 6/2007 |
| JP | 2010-7369 A | 1/2010 |

* cited by examiner

CONSTRUCTION MACHINERY

TECHNICAL FIELD

This invention relates to a construction machine, such as a compact excavator, provided with an operator's cab having a door that can closeably open an ingress/egress opening.

BACKGROUND ART

As a conventional technology of this kind, there is a hydraulic excavator disclosed in Patent Document 1. This hydraulic excavator is provided with an upperstructure, working equipment attached to the upperstructure, an operator's cab mounted on the upperstructure and having a door capable of closeably opening an ingress/egress opening, and a step arranged at the ingress/egress opening of the operator's cab to facilitate ingress to and egress from the operator's cab.

In the operator's cab, a seat is arranged, and further, a floor is arranged on a lower and front side of the seat. The floor is formed of a flat part arranged on a front side of the seat and a stepped part arranged in conjunction with the flat part and on a side of the ingress/egress opening, and the stepped part makes up the above-mentioned step. The stepped part that makes up the step is arranged such that it is located inside the door when the door of the operator's cab is in a closed position. In other words, the stepped part that makes up the step is arranged within the operator's cab.

PRIOR ART DOCUMENT

Patent Document

Patent Document 1: JP-A-2005-226307

DISCLOSURE OF THE INVENTION

Problem to be Solved by the Invention

When the above-mentioned hydraulic excavator is a small construction machine such as a compact excavator, the shape or dimensions of the above-mentioned stepped part have to be unavoidably set small to secure a sufficient foot area in the operator's cab. As a consequence, the ingress to and egress from the operator's cab via the stepped part, that is, the step may not be made with ease.

With the foregoing in view, it may be contemplated to expand or enlarge the shape or dimensions of the stepped part, which makes up the step arranged in the operator's cab, toward the door, and moreover, to form the stepped part large enough to extend along the whole area of the closed door so that the ingress to and egress from the operator's cab can be facilitated even in the case a small construction machine such as a compact excavator. However, such modifications provide the operator's cab with a shell profile that pillars of the operator's cab, said pillars being arranged on the side of the working equipment, that is, front pillars protrude out to a greater extent than before. Such a profile means that the operator's cab protrudes outside a swing radius of the upperstructure, which is fundamentally required for a small construction machine such as a compact excavator and is of a dimension not greater than the width of the construction machine. Therefore, the swing radius of the upperstructure becomes greater than the fundamentally-required swing radius, imposes a restriction on the working environment, and may interfere with a variety of work to be performed by the working equipment of the small construction machine such as the compact excavator.

It may also be contemplated to set the shape or dimensions of the step greater by forming the step such that the step extends outwards from the lower end of the door and is exposed to the outside. If the step is constructed as described above and the construction machine is placed in a cold district to perform work, the step extends out from the door, snow may fall on the externally-exposed part of the step, and the fallen snow may freeze. If such freezing of fallen snow takes place, the door tends to become hardly openable or closeable.

With the above-mentioned actual situation of the conventional art in view, the present invention has as an object thereof the provision of a construction machine with a step arranged in an operator's cab, which makes it possible to enlarge the shape or dimensions of the step without increasing a swing radius.

Means for Solving the Problem

To achieve this object, the present invention is characterized in that, in a construction machine provided with an upperstructure, working equipment attached to the upperstructure, an operator's cab mounted on the upperstructure and having a door capable of closeably opening an ingress/egress opening, and a step arranged at the ingress/egress opening to facilitate ingress to and egress from the operator's cab, the step is provided at a part thereof with an outwardly-extending edge portion that extends out beyond an opening plane forming the ingress/egress opening, and the door is provided at a part thereof with a convex part that covers the outwardly-extending edge portion of the step when the door is in a closed position.

According to the present invention constructed as described, the outwardly-extending edge portion that extends out beyond the opening plane forming the ingress/egress opening of the operator's cab is arranged only at the specific part of the step, so that the step can be provided with the outwardly-extending edge portion without altering the shell profile of the operator's cab. Therefore, the shape or dimensions of the step can be made larger without increasing the swing radius. Further, the outwardly-extending edge portion arranged at the step is covered by the convex part arranged at the specific part of the door when the door has been closed, and therefore, the whole step including the outwardly-extending edge portion can be positioned in the operator's cab. Even when the construction machine is placed in a cold district where snow falls, it is possible to avoid such a situation that fallen snow would freeze on the step.

The present invention may be characterized in that in the above-described invention, a floor of the operator's cab is formed of a flat part arranged on a front side of a seat and a stepped part arranged in conjunction with the flat part and on a side of the ingress/egress opening, a flange part which lies in a same plane as the stepped part of the floor is arranged in conjunction with the stepped part and in the operator's cab, the step comprises the stepped part of the floor and the flange part, and the flange part is provided with the outwardly-extending edge portion.

According to the present invention constructed as described immediately above, advance designing of plural outwardly-extending edge portions of different shapes and plural convex parts of different shapes in combination for the combination of the flange part having the outwardly-extending edge portion and the door having the convex part makes it possible to readily realize an operator's cab, which has a desired combination of a selected flange part and door, without needing alterations to the design of the basic structure of the operator's cab.

The present invention may also be characterized in that in the above-described invention, the operator's cab has a front pillar arranged on a side of the working equipment and a door mount pillar with the door swingably attached thereto, and the front pillar and door mount pillar are arranged such that the ingress/egress opening is flanked therebetween, and the front pillar is provided with a recessed portion to receive therein a side edge portion of the door when the door is closed.

According to the present invention constructed as described immediately above, the side edge portion of the door is received in the recessed portion of the front pillar when the door is closed. Therefore, the side edge portion of the door is not located on a side outer than the front pillar, thereby contributing to the maintenance of the swing radius as a fundamental requirement.

The present invention may also be characterized in that in the above-described invention, the construction machine is a compact excavator, the outwardly-extending edge portion of the flange part is provided on a front-pillar side edge thereof with a bent portion formed such that the bent portion becomes closer to the opening plane as it approaches the front pillar, and the convex part of the door is provided at an edge portion thereof, which is located on a side closer to the front pillar when the door has been closed, with a bent portion located opposite the bent portion of the outwardly-extending edge portion when the door has been closed, and the bent portion of the outwardly-extending edge portion of the door forms a relief recess to avoid an interference with an exterior cover of the upperstructure upon opening of the door.

According to the present invention constructed as described immediately above, the bent portion of the outwardly-extending edge portion of the door forms the relief recess that avoids an interference with the exterior cover which makes up the upperstructure. It is, therefore, possible to prevent damage to the door and exterior cover, which may occur in association with opening of the door.

Advantageous Effects of the Invention

As the step is provided at the specific part thereof with the outwardly-extending edge portion, which extends out beyond the opening plane forming the ingress/egress opening, and the door is provided at the specific part thereof with the convex part that covers the outwardly-extending edge portion of the step when the door is in a closed position, the present invention makes it possible to provide the step with the outwardly-extending edge portion without altering the shell profile of the operator's cab. In other words, the shape or dimensions of the step can be enlarged without making the swing radius greater. As a consequence, desired work can be performed without problem by turning the upperstructure and driving the working equipment, and further, the ingress to and egress from the operator's cab can be more facilitated than before. In addition, the outwardly-extending edge portion of the flange part is covered by the convex part arranged at the door when the door has been closed. It is, therefore, possible to avoid such a situation that fallen snow would freeze on the step even when the construction machine is placed in a cold district where snow falls. Accordingly, the construction machine according to the present invention does not cause the situation that the door would become unopenable due to frozen snow, and can realize smooth opening and closure of the door.

MODES FOR CARRYING OUT THE INVENTION

An embodiment of the construction machine according to the present invention will hereinafter be described based on the drawings.

Figure 1:
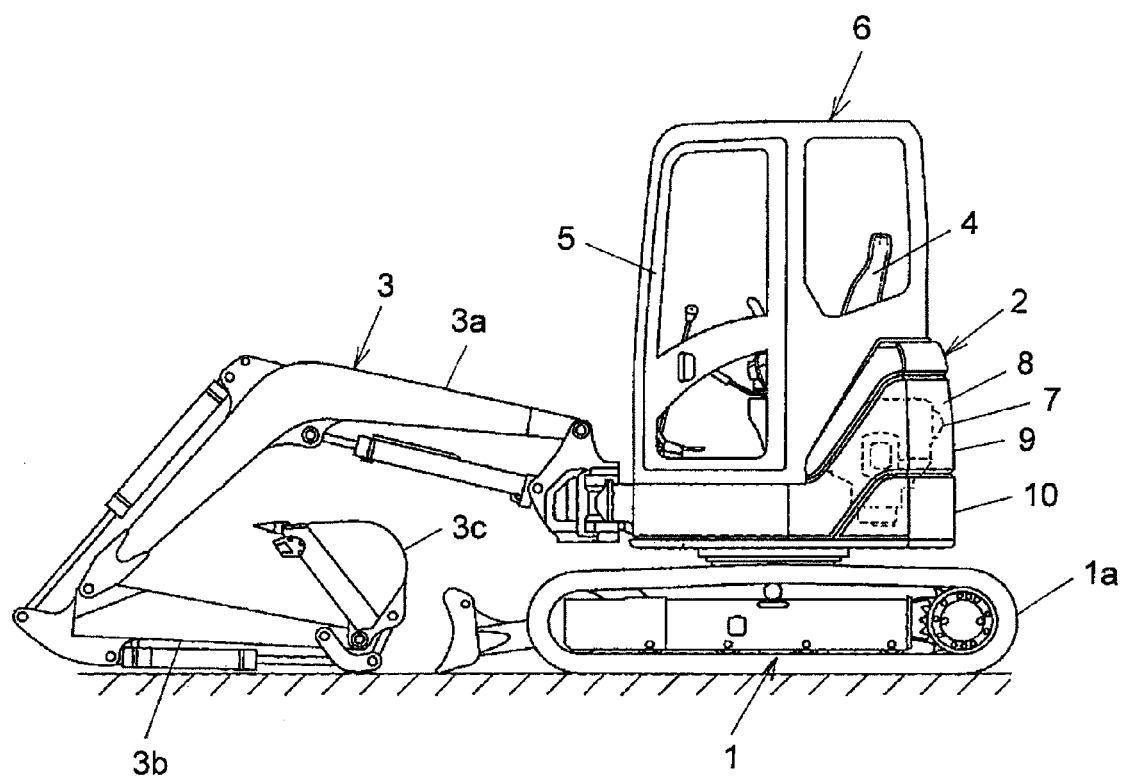
FIG. 1 is a side view showing a compact excavator as an embodiment of the construction machine according to the present invention.
Figure 2:
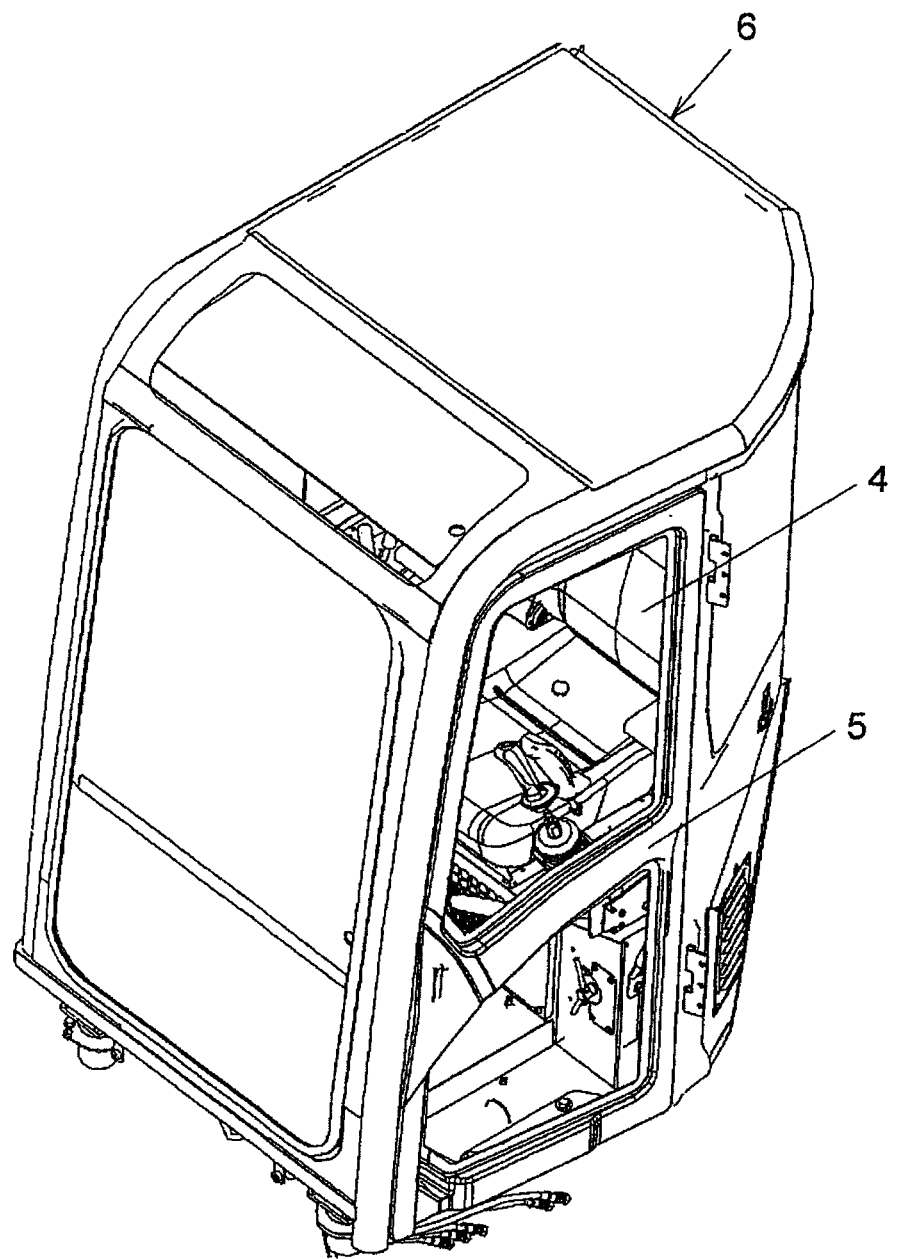
FIG. 2 is a perspective view showing an operator's cab arranged in the compact excavator depicted in FIG. 1

FIG. 1 is a side view showing a compact excavator as an embodiment of the construction machine according to the present invention, and FIG. 2 is a perspective view showing an operator's cab arranged in the compact excavator depicted in FIG. 1.

As depicted in FIGS. 1 and 2, the construction machine of this embodiment is constructed as a compact excavator which is one type of a small construction machine. This compact excavator is provided with a travel base 1 having a pair of left and right crawler tracks 1a, an upperstructure 2 mounted on the travel base 1, and working equipment 3 attached to the upperstructure 2 tiltably in an up-and-down direction. The working equipment 3 includes a boom 3a attached to the upperstructure 2, an arm 3b connected to a free end of the boom 3a, and a bucket 3c connected to a free end of the arm 3b.

On the upperstructure 2, an operator's cab 6 is mounted. The operator's cab 6 houses a seat 4, and has a door 5 that can closeably open an ingress/egress opening. Also mounted on the upperstructure 2 include an engine compartment 9 housing an engine 7, unillustrated pumps and the like and externally covered by an exterior cover 8, and a counterweight 10 for ensuring static balance.

Figure 3:
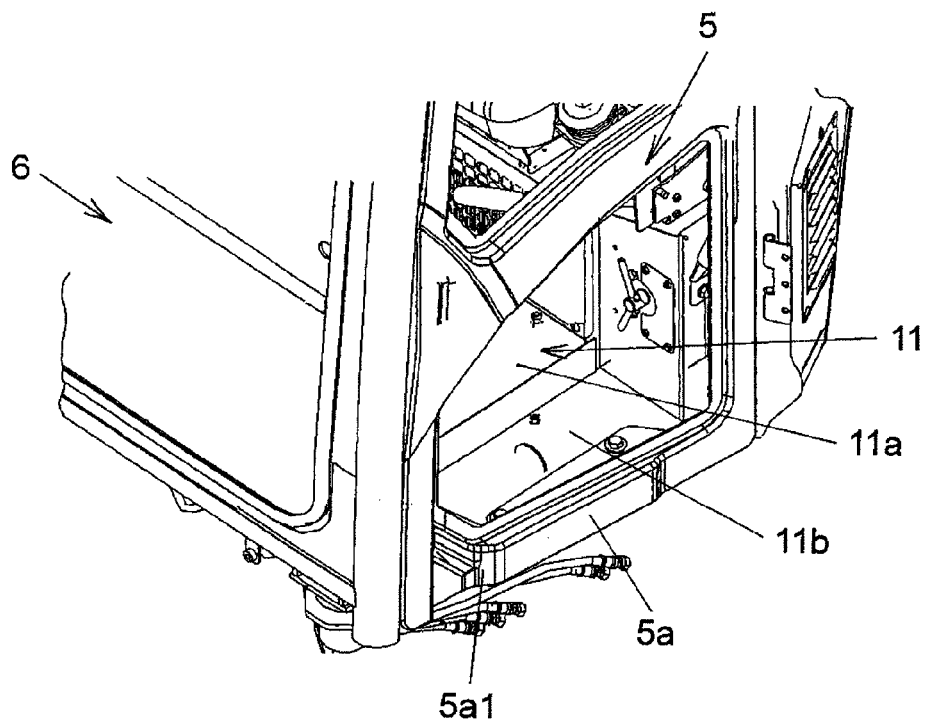
FIG. 3 is a fragmentary perspective view showing the operator's cab depicted in FIG. 2, in which a door is in a closed position.
Figure 4:
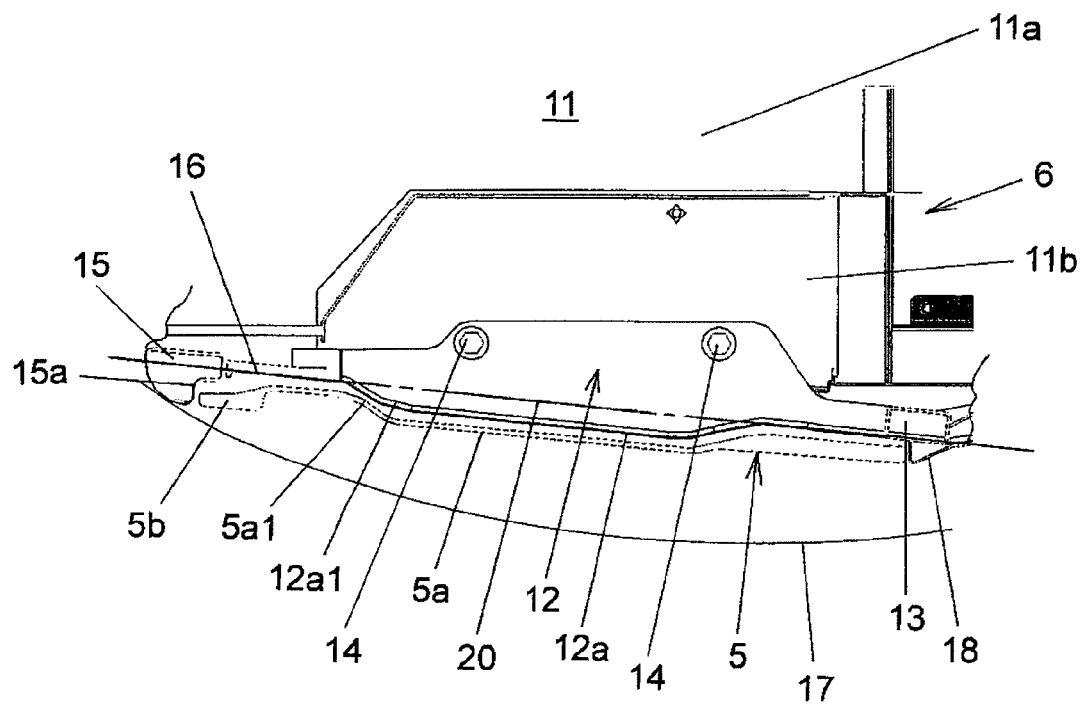
FIG. 4 is a partially cross-sectional plan view showing the operator's cab depicted in FIG. 2, in which the door is in the closed position.
Figure 5:
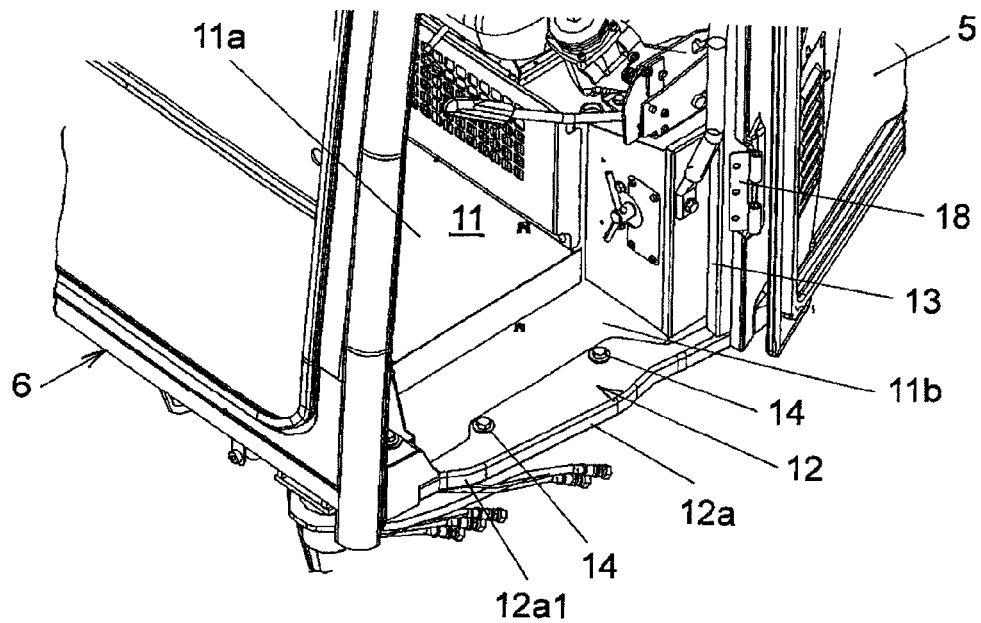
FIG. 5 is a fragmentary perspective view showing the operator's cab depicted in FIG. 2, in which the door is in an open position.
Figure 6:
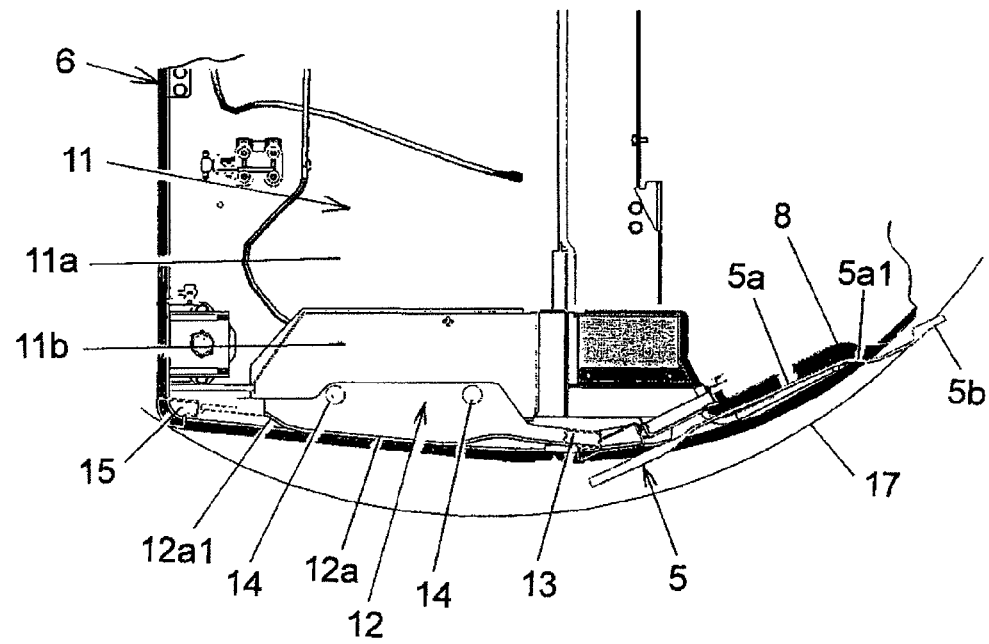
FIG. 6 is a partially cross-sectional plan view showing the operator's cab depicted in FIG. 2, in which the door is in the open position.

FIG. 3 is a fragmentary perspective view showing the operator's cab depicted in FIG. 2, in which a door is in a closed position, FIG. 4 is a partially cross-sectional plan view showing the operator's cab depicted in FIG. 2, in which the door is in the closed position, FIG. 5 is a fragmentary perspective view showing the operator's cab depicted in FIG. 2, in which the door is in an open position, and FIG. 6 is a partially cross-sectional plan view showing the operator's cab depicted in FIG. 2, in which the door is in the open position.

The compact excavator according to this embodiment is provided, at a part of a step that facilitates the ingress to and egress from the operator's cab 6, with an outwardly-extending edge portion 12a that extends out beyond an opening plane 16 forming an ingress/egress opening 20 of the operator's cab 6.

Described specifically, as depicted in FIGS. 3 through 6, a floor 11 of the operator's cab 6 includes a flat part 11a arranged on a front side of the above-mentioned seat 4 and a stepped part 11b arranged in conjunction with the flat part 11a, at a position lower than the flat part 11a and on a side of the ingress/egress opening. A flange part 12 which lies in a same plane as the stepped part 11b of the floor 11 is arranged in conjunction with the stepped part 11b and in the operator's cab 6, the above-mentioned step is formed of the stepped part 11b of the floor 11 and the flange part 12, and the flange part 12 is provided with the outwardly-extending edge portion 12a that extends out beyond the opening plane 16 forming the ingress/egress opening 20 depicted in FIG. 4.

The flange part 12 is detachably secured by a pair of bolts 14 on a frame that makes up the operator's cab 6. An end face of a primary portion of the outwardly-extending edge portion 12a arranged on the flange part 12 is formed, for example, in a linear shape extending in a horizontal plane.

As depicted in FIGS. 4 and 6, the operator's cab 6 has a pillar arranged on a side of the working equipment, i.e., a front pillar 15 and another pillar with the door 5 swingably attached thereto via hinges 18, i.e., a door mount pillar 13, and the front pillar 15 and door mount pillar 13 are arranged such that the ingress/egress opening is flanked therebetween. As illustrated in FIG. 4, the outwardly-extending edge portion 12a of the flange part 12 is provided on an edge thereof, which is on a side of the front pillar 15, with a bent portion 12a1 formed such that the bent portion 12a1 becomes closer to the opening plane 16 forming the ingress/egress opening 20 as it approaches the front pillar 15.

As shown in FIGS. 3 and 4, the door 5 is provided at a part of a lower end section thereof with a convex part 5a that covers the outwardly-extending edge portion 12a arranged at the flange part 12, which makes up the step, when the door is in a closed position. A primary part of the convex part 5a is formed in the shape of a flat surface corresponding to the linear shape of the end face of the primary portion of the outwardly-extending edge portion 12a of the flange part 12. This convex part 5a is integrally arranged, for example, by stamping upon fabrication of the door 5.

As illustrated in FIG. 4, the front pillar 15 is provided with a recessed portion 15a to receive therein a side edge portion 5b of the door 5 when the door 5 is in the closed position.

As also depicted in FIG. 4, the convex part 5a of the door 5 is provided at an edge portion thereof, which is located on a side closer to the front pillar 15 when the door 5 has been closed, with a bent portion 5a1 located opposite the bent portion 12a1 of the above-mentioned, outwardly-extending edge portion 12a when the door 5 has been closed. As illustrated in FIG. 6, this bent portion 5a1 forms a relief recess to avoid an interference with the exterior cover 8 of the upperstructure 2 upon opening of the door 5.

No alteration has been made to the basic shell profile of the operator's cab 6, and as a consequence, a swing radius 17 shown in FIGS. 4 and 6 is set to maintain a swing radius equivalent to those in conventional compact excavators, that is, a dimension not greater than the width as defined by the pair of crawler tracks 1a of the travel base 1. Further, as depicted in FIG. 6, the position of the side edge portion 5b when the door 5 has been opened is set to lie, for example, approximately on the swing radius 17.

In this embodiment constructed as described above, it is necessary for an operator, who wants to sit in the seat 4 to perform work, simply to open the door 5, to put his or her foot on the step formed of the stepped part 11b of the floor 11 and the flange part 12 having the outwardly-extending edge portion 12a, to move up to the flat part 11a of the floor 11, and then to sit in the seat 4, as illustrated in FIGS. 5 and 6. The operator who has sat in the seat 4 as described above can drive, for example, the working equipment 3 depicted in FIG. 1 to perform desired work such as digging work of earth or sand by manipulating control levers arranged in the operator's cab 6. As depicted in FIG. 6, the door 5 is located to oppose the exterior cover 8 of the upperstructure 2 when the door 5 has been fully opened. During work, the door 5 is closed as needed.

Upon completion of the work, the operator leaves from the seat 4, and moves down from the flat part 11a of the floor 11 to the step formed of the stepped part 11b and flange part 12, and further to a ground surface on which the compact excavator rests. The operator may then close the door 5 as shown in FIGS. 3 and 4. Consequently, as shown in FIG. 4, the outwardly-extending edge portion 12a of the flange part 12 is covered by the convex part 5a of the door 5, and the side edge portion 5b of the door 5 is received in the recessed portion 15a of the front pillar 15.

In the above-described embodiment, the end face of the primary portion of the outwardly-extending edge portion 12a on the flange part 12 is formed in the linear shape extending in the horizontal plane, and the primary part of the convex part 5a of the door 5 is formed in the shape of the flat surface. However, the end face of the primary portion of the outwardly-extending edge portion 12a on the flange part 12 may be formed, for example, in a curved shape or rugged shape extending in a horizontal plane. Further, the convex part 5a of the door 5 may be formed to define a curved surface in a horizontal plane or a curved surface in a vertical plane. These outwardly-extending edge portion 12a and convex part 5a can be formed in various shapes.

According to this embodiment constructed as described above, the outwardly-extending edge portion 12a, which extends out beyond the opening plane 15 forming the ingress/egress opening 20 of the operator's cab 20, is arranged, as illustrated in FIG. 4, only at the specific part of the flange part 12 that makes up the step. It is, therefore, possible to provide the step with the outwardly-extending edge portion 12a without altering the shell profile of the operator's cab 6. In other words, the shape or dimensions of the step can be enlarged without making the swing radius 17 greater. As a consequence, desired work can be performed without problem by turning the upperstructure 2 and driving the working equipment 3, and further, the ingress to and egress from the operator's cab 6 can be achieved with ease.

In addition, the outwardly-extending edge portion 12a of the flange part 12 is covered by the convex part 5a arranged at the door 5 when the door 5 has been closed. The whole step including the outwardly-extending edge portion 12a can hence be positioned in the operator's cab 6. It is, therefore, possible to avoid such a situation that fallen snow would freeze on the step including the outwardly-extending edge portion 12a even when the compact excavator is placed in a cold district where snow falls. Accordingly, the compact excavator does not cause the situation that the door 5 would become unopenable due to frozen snow, and can realize smooth opening and closure of the door 5.

Further, advance designing of plural outwardly-extending edge portions of different shapes and plural convex parts of different shapes in combination for the combination of the flange part 12 having the outwardly-extending edge portion 12a and the door 5 having the convex part 5a makes it possible to readily realize an operator's cab 6, which has a desired combination of a selected flange part 12 and door 5, without needing alterations to the design of the basic structure of the operator's cab 6.

As illustrated in FIG. 4, the side edge portion 5a of the door 5 is received in the recessed portion 15a of the front pillar 15 when the door 5 is closed. Therefore, the side edge portion 5b of the door 5 is not located on a side outer than the front pillar 15, thereby contributing to the maintenance of the swing radius 17 as a fundamental requirement.

As depicted in FIG. 6, the bent portion 5a1 of the outwardly-extending edge portion 5a of the door 5 forms the relief recess that avoids an interference with the exterior cover 8 which makes up the upperstructure 2. It is, therefore, possible to prevent damage to the door 5 and exterior cover 8, which may occur in association with opening of the door 5, so that a high-reliability compact excavator can be realized.

Although the above-described embodiment is applied to a compact excavator, the construction machine according to the present invention can be a hydraulic excavator greater than the compact excavator, and can also be a construction machine different from a hydraulic excavator provided that an operator's cab having a closeable door is mounted on an upperstructure.

LEGEND

1 Travel base
2 Upperstructure
3 Working equipment
4 Seat
5 Door
5a Convex part
5a1 Bent portion
5b Side edge portion
6 Operator's cab
8 Exterior cover
11 Floor
11a Flat part
11b Stepped part
12 Flange part
12a Outwardly-extending edge portion
12a1 Bent portion
13 Door mount pillar
14 Bolt
15 Front pillar
15a Recessed portion
16 Opening plane
17 Swing radius
20 Ingress/egress opening

The invention claimed is:

1. A construction machine provided with a travel base having a pair of left and right crawler tracks, an upperstructure turnably mounted on the travel base, working equipment attached to the upperstructure, an operator's cab mounted on the upperstructure and having a door capable of closably opening an ingress/egress opening, and a step arranged at the ingress/egress opening to facilitate ingress to and egress from the operator's cab, wherein:

the step is positioned in the operator's cab, a part of the step having an outwardly-extending edge portion that extends out beyond an opening plane forming the ingress/egress opening, and the door is provided at a part thereof with a convex part that covers the step entirely, including the outwardly-extending edge portion, when the door is in a closed position.

2. The construction machine according to claim 1, wherein:

a floor of the operator's cab is formed of a flat part arranged on a front side of a seat and a stepped part arranged in conjunction with the flat part and on a side of the ingress/egress opening, a flange part which lies in a same plane as the stepped part of the floor is arranged in conjunction with the stepped part and in the operator's cab, the step comprises the stepped part of the floor and the flange part, and the flange part is provided with the outwardly-extending edge portion.

3. The construction machine according to claim 2, wherein:

the operator's cab has a front pillar arranged on a side of the working equipment and a door mount pillar with the door swingably attached thereto, and the front pillar and door mount pillar are arranged such that the ingress/egress opening is flanked therebetween, and the front pillar is provided with a recessed portion to receive therein a side edge portion of the door when the door is in the closed position.

4. The construction machine according to claim 3, wherein:

the construction machine is a compact excavator, the outwardly-extending edge portion of the flange part is provided on a front-pillar side edge thereof with a bent portion formed such that the bent portion becomes closer to the opening plane as it approaches the front pillar, and the convex part of the door is provided at an edge portion thereof, which is located on a side closer to the front pillar when the door has been closed, with a bent portion located opposite the bent portion of the outwardly-extending edge portion when the door has been closed, and the bent portion of the outwardly-extending edge portion of the door forms a relief recess to avoid an interference with an exterior cover of the upperstructure upon opening of the door.

* * * * *